June 26, 1956   G. B. MIRUS   2,751,952
KITCHEN PARING BAG
Filed Aug. 3, 1953

INVENTOR
Gilbert B. Mirus.
BY
ATTORNEY

United States Patent Office 2,751,952
Patented June 26, 1956

2,751,952
KITCHEN PARING BAG

Gilbert B. Mirus, Monrovia, Calif.

Application August 3, 1953, Serial No. 371,959

3 Claims. (Cl. 150—.5)

The present invention generally relates to a transparent, vapor confining and anti-allergy utensil and more particularly to a transparent muff or bag for use in peeling vegetables, such as onions and the like, although other uses may be made of the device.

An object of the invention is to provide a new and useful utensil for hand preparation of vegetables, whereby all vapors, juices and the like are sealed within the utensil during preparation and away from the face of the user.

Another object is to provide a foldable transparent muff formed with sealing end walls having hand openings therein and means for sealing the walls around the user's wrists, and the body of muff being large enough inside to permit free movement of the user's hands therein.

Another object is to provide a kitchen paring muff made of a material or materials that are transparent enough to permit clear vision of all work performed therein and of material impervious to moisture, gases and vapors.

With these and other objects in view which will become apparent as the present invention is fully understood, the same resides in the novelty of construction, combination and arrangement of elements hereinafter described in detail and distinctly claimed in the appended claims.

The description should be read in conjunction with the accompanying drawings, wherein three embodiments of the invention are illustrated and wherein like characters of reference designate like or similar elements throughout the several views.

Figure 1:
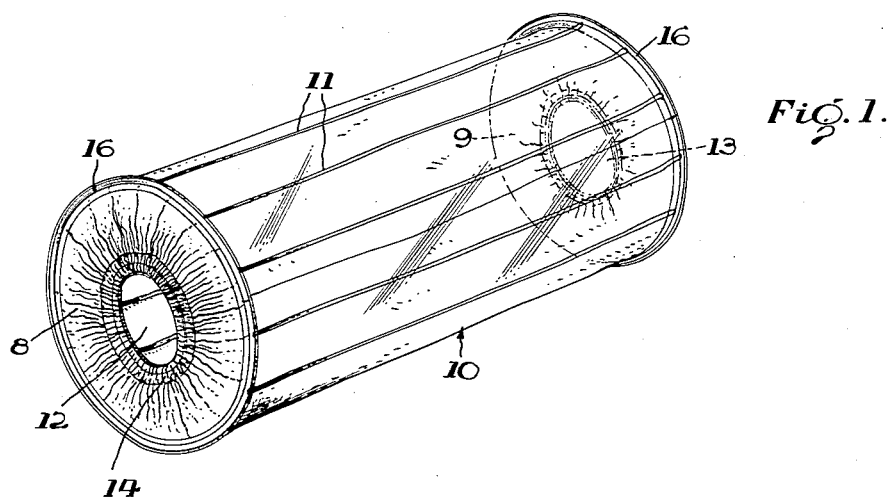
Figure 1 is a perspective view of one embodiment of the present novel structure in its most simplified form.

Referring now in detail to the drawings and first with particular reference to Figure 1, the utensil may be made of any suitable transparent material, such as "Pliofilm" or some other material impervious to moisture, gases and vapors. The transparency of the material is preferably sufficient to permit reasonably clear vision therethrough. This utensil is similar in construction to a transparent muff with opposite end walls 8 and 9 and comprises a body 10, which may be cylindrical in form when extended for use and which may be folded like an accordion when it is to be stored away in a drawer or the like.

The cylindrical body 10 may if desired be ornamented with longitudinal colored plastic ribs, lines or strips 11 thereon. Furthermore, the said strips 11 provide reinforcements for the cylindrical body 10. Each end of the cylinder or tube 10 is closed by one of the end walls 8 and 9. Openings 12 and 13 are made in each end wall and the edge around each opening is formed with a channel 14 and the material is gathered around each opening by an elastic member 15 in each respective channel.

Thus, the elastic members, such as cords 15 cause gathering of the end walls around the openings, so that after expansion by insertion of the hands of a user of the utensil into the body 10, the elastic will cause the openings to assume the size and shape of the arms or wrists and thereby create a seal between the outside and the inside of the same.

The body 10 and the end walls 8 and 9 of the utensil may be joined together in any suitable manner, such as by sealing the edges of the ends and body together, and then encircling the seal with a hoop-like plastic strip of reinforcement 16 or the like and the said reinforcing strips 11 extend longitudinally of the body 10 substantially from one strip 16 to the other.

Figure 2:
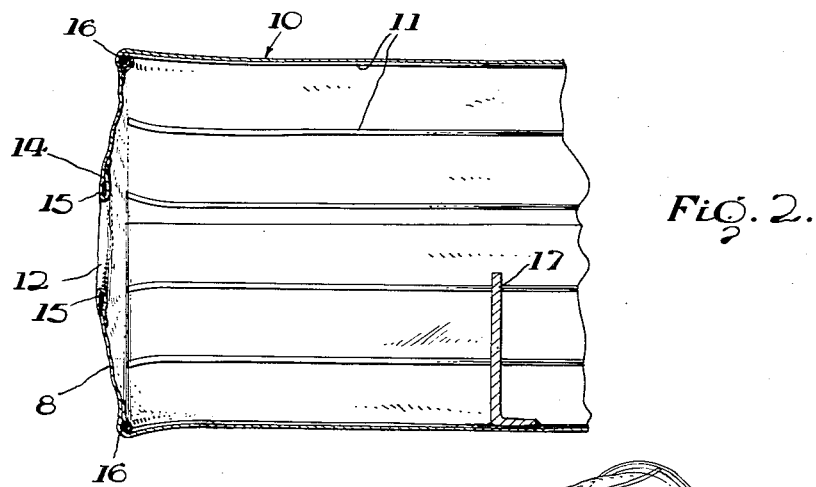
Figure 2 is a cross-section view of the device with the addition of a dividing partition therein to separate the waste material from the substance to be saved for use and thus constituting another embodiment.

In Figure 2 is illustrated an identical device to Figure 1, except that a partition 17 is mounted in the bag or body 10. This partition may be transverse the body or longitudinally of the body as desired for the work to be performed, but is shown in Figure 2 transverse the body.

When using the muff with the partition, the onions or garlic and the knife, grater or other article of preparation is inserted in the bag body 10 with or prior to insertion of the hands. The peelings and undesirable parts can be dropped on one side of the partition and the desirable parts can be dropped on the opposite side of the partition, thereby keeping the parts separate.

Figure 3:
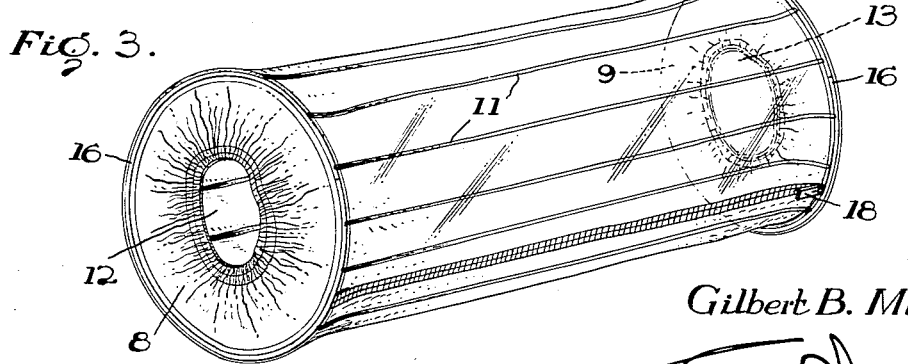
Figure 3 shows a third embodiment of the device in perspective with a side opening and cooperating slide fastener for the opening.

Figure 3 is representative of a device structurally identical to Figure 1, except for an elongated opening in the body 10 closed and opened by a slide fastener 18. This additional opening permits insertion of larger objects into the body 10 when desired or, alternatively, readily disposing of the contents of the bag body 10.

Without further description, it is believed that the use and operation of the device is clear. Also, the device is not restricted to the uses above outlined, but is to be considered applicable for use in connection with any other work of a household, industrial or other nature where the operator desires to be protected from exposure to the gases, radiations, vapors or offensive odors likely to be encountered. In such other uses the device need only be made to the proper size and shape to suit each operation.

While in the foregoing specification and drawings there has been shown and described only three embodiments of this invention, it is to be understood that changes in the details of construction, combination and arrangement of parts may be resorted to without departing from the spirit and scope of the invention as hereinafter claimed.

I claim:

1. A bag for use in the hand preparation of vegetables with the retention of the juices and vapors therein, comprising an elongated hollow body of thin, flexible and transparent material, a wall at each end of said body of thin, flexible and transparent material, each of said end walls being provided with a hand receiving opening, elastic sealing means encircling each opening for embracing the wrists of a user when his hands are inserted into the body in a vegetable preparation, a reinforcing strip disposed at the juncture of each of said end walls with the respective end of said body and extending completely around the same, and laterally spaced reinforcing strips extending longitudinally of said body substantially from one of said first reinforcing strips to the other thereof.

2. The structure according to claim 1, wherein said body is provided with a material receiving and discharging opening which extends longitudinally of the body substantially from one end to the other end thereof, and means for normally closing the said opening.

3. The structure according to claim 1, together with a partition in said body for separating vegetable portions in the preparation thereof.

References Cited in the file of this patent

UNITED STATES PATENTS

| | | |
|---|---|---|
| 72,049 | King | Dec. 10, 1867 |
| 238,606 | Pass | Mar. 8, 1881 |
| 2,039,490 | Mikelson | May 5, 1936 |
| 2,189,955 | Hokerk | Feb. 13, 1940 |
| 2,311,277 | Williams | Feb. 11, 1943 |
| 2,321,091 | Kertesz et al. | June 8, 1943 |
| 2,335,293 | Meyer | Nov. 30, 1943 |
| 2,497,325 | Scherba | Feb. 14, 1950 |
| 2,554,199 | Lewis | May 22, 1951 |